Patented Sept. 26, 1939

2,174,239

UNITED STATES PATENT OFFICE 2,174,239

PREPARING ACETYL ACETIC ACID DERIVATIVES

Anthony H. Gleason, Elizabeth, N. J., assignor to Standard Oil Development Company, a corporation of Delaware No Drawing. Application March 5, 1936, Serial No. 67,307

6 Claims. (Cl. 260—251)

The present invention relates to improved processes for making acetyl acetic acid derivatives and comprises broadly reacting a dimer of a ketene with an amine containing at least 1 hydrogen connected to the nitrogen, particularly aromatic amines such as aniline, and, during the reaction, preventing rise of temperature above that at which undesirable reactions or side reactions occur to a substantial extent.

It is known that diketene, which is the dimer of acetic ketene and otherwise known as cyclobutane 1,3 dione, will react with aniline to form acetoacetanilide, but the reaction is so violent and difficult to control that the yields and quality of the product heretofore obtained have been very poor.

The object of the present invention is to control this type of reaction in such a way as to prevent undesirable side reactions whereby both the yield and quality of the products, such as acetoacetanilide, are greatly improved. By the present invention the reaction may be carried out very smoothly and may be controlled at will, thereby greatly eliminating waste and inefficiency.

One modification of the invention is to carry out the reaction in the presence of a suitable solvent, preferably one which is a mutual solvent for the diketene and for the amine, such as aniline with which it is to be reacted. Another modification of the invention is to provide adequate means of cooling the reaction liquid, and if desired for still better control, a combination of both a solvent, diluent and cooling may be used.

Although the present invention is not concerned with the method of preparing the diketene (cyclobutane 1,3 dione) one suitable method is described in U. S. Patent 1,998,404.

Although the present invention contemplates preferably using the diketene itself because it has a suitable reactivity, and at the same time may be prepared easily and with good yields from acetic ketene, which is the simplest and most readily available member of the ketene group, yet dimers of other ketenes may be used, for example, the dimer of methyl ketene or dimethyl ketene or ketenes having other alkyl or aryl groups as substituents for one or both of the hydrogens in acetic ketene.

Also, instead of using aniline, a large number of other amines and organic compounds of the ammonium system containing oxygen connected to a carbon atom as well as an amino group or nitrogen, both simple and complex may be used, a number of which are listed herewith:

Hydroxyl amine
Ethyl amine
Butyl amine
Diethyl amine
Monoethanolamine
Diethanolamine Ethylene diamine
Cracked wax amines
Hydrazine
Glycine
Urea but the invention is particularly applicable to other aromatic amines, such as:

Toluidine
Naphthylamine
Cyclohexylamine

Phenylene diamine
Phenyl hydrazine
Hydrazobenzene

The invention is considered to include primary and secondary amine derivatives containing hydroxyl, alkyl and aryl substituents, as well as other types of compounds, such as amino acids which fall within the general classification mentioned above. It should be noted that when diketene is reacted with urea, $CO(NH_2)_2$, the product formed is methyl uracil.

When controlling the reaction by the use of a solvent or diluent, one must be used which does not harmfully affect the desired reaction, such as by partially reacting with the amines. One particularly suitable solvent is ether, although others such as benzol, toluene, destructively hydrogenated naphtha, etc. may be used. Others which may be used if care is taken to prevent side reactions include acetone, carbon disulfide and chlorinated hydrocarbons.

For the sake of illustration, the following specific example is given:

1 part by weight of aniline is dissolved in about 5 parts of ether at room temperature and 1 part of diketene slowly added with stirring.

As soon as the reaction is complete the reaction liquid is allowed to stand and the crystals of acetoacetanilide which form, are separated by decantation or filtration and washing with a small amount of cold ether or other suitable washing liquids.

Generally the amount of solvent to be used should be between the approximate limits of 2 to 10 parts for 1 part of diketene and generally approximately 1 mol. of aniline or other amine should be used per mol. of the diketene, and the reaction is preferably carried out at room temperature or slightly above. The temperature should not in any case be allowed to exceed, even locally, in the reaction liquid the temperature of 80 or 100° C., and to prevent any overheating, the reaction apparatus may be equipped with suitable cooling coils, either inside or outside, or the reaction may be carried out under slightly elevated pressure, so that if the temperature tends to rise excessively, the pressure may be reduced, thereby flashing off some of the volatile solvent and thus reducing the temperature by absorbing the latent heat of vaporization of the solvent.

The reaction may be conveniently carried out continuously in a very simple manner by merely feeding the ketene polymers into a pipe or reaction vessel through which, or into which, solvent flows continuously, and then continuously adding the stoichiometric amount of the desired amine. Inasmuch as the reaction takes places quickly and smoothly when carried out under the conditions of this invention, the reaction liquid may be passed directly to a continuous crystallizing vat where either the liquid may be cooled or some of the solvent evaporated in order to facilitate crystallization. The crystallization may be carried out in one or more steps and the product may be recrystallized if desired. The solvent, recovered either by filtration or evaporation, may then be continuously recycled to the reaction zone.

The invention is not to be limited to the specific embodiments described, the specific examples given, nor to any theories advanced as to the operation of the invention, but in the appended claims it is intended to claim all inherent novelty in the invention as broadly as the prior art permits.

I claim:

1. Process for making acetyl acetic acid derivatives which comprises reacting diketene with an aliphatic compound selected from the class consisting of hydroxy amines and urea, and during said reaction preventing a rise of temperature above that at which undesirable side reactions occur to a substantial extent.

2. Process according to claim 1, carried out in the presence of a solvent.

3. Process according to claim 1, in which the reaction liquid is cooled during the reaction.

4. Process according to claim 1, carried out at a temperature below about 100° C.

5. Process according to claim 1, carried out in the presence of a solvent and in which the reaction liquid is cooled during the reaction.

6. Process for making methyl uracil which comprises reacting diketene with urea, and during said reaction preventing rise of temperature above that at which undesirable side reactions occur to a substantial extent.

ANTHONY H. GLEASON.